(12) United States Patent
Greentree (10) Patent No.: US 8,146,358 B2
(45) Date of Patent: *Apr. 3, 2012

(54) BEARING HEALTH MONITOR

(75) Inventor: Christopher Greentree, Redondo Beach, CA (US)

(73) Assignee: Honeywell International, Inc., Morristown, NJ (US)

( * ) Notice: Subject to any disclaimer, the term of this patent is extended or adjusted under 35 U.S.C. 154(b) by 209 days.

This patent is subject to a terminal disclaimer.

(21) Appl. No.: 12/455,534

(22) Filed: Jun. 3, 2009

(65) Prior Publication Data
US 2009/0266073 A1 Oct. 29, 2009

Related U.S. Application Data (63) Continuation of application No. 11/247,871, filed on Oct. 11, 2005, now Pat. No. 7,631,498.

(51) Int. Cl.
| | |
|---|---|
| G01B 7/14 | (2006.01) |
| G01B 7/30 | (2006.01) |
| G01P 3/48 | (2006.01) |
| G01H 1/00 | (2006.01) |
| G01H 11/00 | (2006.01) |
| B60Q 1/00 | (2006.01) |
| G06F 11/30 | (2006.01) |
| G06F 15/00 | (2006.01) |
| F01D 17/06 | (2006.01) |
| F01D 25/16 | (2006.01) |
| F01D 21/00 | (2006.01) |
| F01D 25/04 | (2006.01) |
| F02B 33/44 | (2006.01) |

(52) U.S. Cl. ............ 60/605.1; 324/207.23; 324/207.25; 324/207.15; 324/174; 73/660; 340/441; 702/184; 384/448; 384/624; 415/119

(58) Field of Classification Search ................. 60/605.1; 324/207.23, 207.25, 207.15, 174, 662; 384/448, 384/624; 340/441, 686.2; 73/514.31, 514.39, 73/593, 579, 86, 660, 114.81; 415/119; 702/184, 702/34

See application file for complete search history.

(56) References Cited

U.S. PATENT DOCUMENTS

| | | | | | |
|---|---|---|---|---|---|
| 3,220,244 | A | * | 11/1965 | Donnelly | 73/37.6 |
| 3,981,621 | A | * | 9/1976 | Considine | 384/448 |
| 4,046,003 | A | * | 9/1977 | Armstrong et al. | 702/183 |
| 4,439,728 | A | * | 3/1984 | Rickman, Jr. | 324/207.15 |
| 4,518,917 | A | * | 5/1985 | Oates et al. | 324/207.25 |
| 4,520,674 | A | * | 6/1985 | Canada et al. | 73/660 |
| 4,924,180 | A | * | 5/1990 | Nasr et al. | 324/207.15 |
| 4,953,110 | A | * | 8/1990 | Chartrand | 340/441 |
| 5,101,165 | A | * | 3/1992 | Rickards | 324/662 |
| 5,160,876 | A | * | 11/1992 | Niinai et al. | 318/460 |
| 5,336,996 | A | * | 8/1994 | Rusnak | 324/207.2 |
| 5,408,225 | A | * | 4/1995 | Stadelhofer | 340/686.2 |

(Continued)

FOREIGN PATENT DOCUMENTS

| | | | | | |
|---|---|---|---|---|---|
| EP | 1304463 | A1 | * | 4/2003 | 73/579 |

(Continued)

*Primary Examiner* — Thai Ba Trieu
(74) *Attorney, Agent, or Firm* — The Law Office of John A. Griecci (57) ABSTRACT

A turbocharger monitor including a sensor adapted and positioned with respect to a turbocharger housing to sense passing compressor blades, generating both rotor rotation information and rotor displacement information. A controller is configured to receive the generated information from the blade sensor, and to establish rotor rotation speed and an indicator of bearing condition.

18 Claims, 6 Drawing Sheets

U.S. PATENT DOCUMENTS

| | | | |
|---|---|---|---|
| 5,508,609 A * | 4/1996 | Parkinson et al. | 324/207.25 |
| 5,865,543 A * | 2/1999 | MacLean | 384/448 |
| 5,866,824 A * | 2/1999 | Schieber | 73/861.79 |
| 6,107,794 A * | 8/2000 | Kipp et al. | 324/207.23 |
| 6,163,254 A * | 12/2000 | Smith et al. | 340/441 |
| 6,377,876 B1 * | 4/2002 | Hedeen et al. | 701/34 |
| 6,412,339 B1 * | 7/2002 | Care | 73/86 |
| 6,508,128 B2 * | 1/2003 | Bode | 73/593 |
| 6,594,619 B1 * | 7/2003 | von Flotow | 702/184 |
| 6,785,635 B2 * | 8/2004 | von Flotow | 702/184 |
| 7,333,913 B2 * | 2/2008 | Andarawis et al. | 702/158 |
| 7,582,359 B2 * | 9/2009 | Sabol et al. | 702/182 |
| 2002/0000126 A1 * | 1/2002 | Barclay | 73/593 |
| 2005/0017709 A1 * | 1/2005 | Stolfus et al. | 324/174 |
| 2005/0155349 A1 * | 7/2005 | Sugiura et al. | 60/605.1 |
| 2006/0000283 A1 * | 1/2006 | Twerdochlib | 73/593 |
| 2006/0056959 A1 * | 3/2006 | Sabol et al. | 415/118 |
| 2006/0239813 A1 * | 10/2006 | Shah et al. | 415/119 |
| 2007/0043497 A1 * | 2/2007 | Leogrande et al. | 701/100 |
| 2010/0292937 A1 * | 11/2010 | Hosny et al. | 702/34 |

FOREIGN PATENT DOCUMENTS

| | | | |
|---|---|---|---|
| GB | 2064675 A * | 6/1981 | 384/129 |

* cited by examiner

BEARING HEALTH MONITOR

This application is a continuation application of application Ser. No. 11/247,871, filed Oct. 11, 2005 now U.S. Pat. No. 7,631,498.

The present invention relates generally to turbomachinery and, more particularly, to apparatus and methods of monitoring the condition of turbocharger bearings.

BACKGROUND OF THE INVENTION

Turbochargers may be used with internal combustion engines to increase the available power from a given size of engine. In use, turbochargers experience a wide array of operating conditions, through a wide array of parameters such as operating speed, temperature, engine backpressure, oil pressure, oil quality, and the like. Depending upon the operating conditions experienced by a given turbocharger, its service life may vary significantly from that expected.

Bearing wear significantly affects the turbocharger's service life. Bearing wear can be exacerbated by a variety of conditions, including fuel or particulate contaminants in oil used to lubricate the turbocharger, excessive rotor speeds, and excessive operating temperatures. When bearing wear exceeds an acceptable level, compressor or turbine blades may come in to contact with their respective housings, leading to catastrophic failure. Such failures can lead to failure of the related internal combustion engine, oil discharges—either externally or into other systems, and possibly even engine fires. It is therefore preferable to anticipate turbocharger failure accurately before it occurs, thus allowing repair or replacement before catastrophic failure.

Accordingly, there has existed a need for a turbocharger bearing wear monitor to provide information on the condition of the turbocharger, and or to provide protection to internal combustion engines from the dangers of turbocharger failure. Preferred embodiments of the present invention satisfy these and other needs, and provide further related advantages.

SUMMARY OF THE INVENTION

In various embodiments, the present invention solves some or all of the needs mentioned above, providing a turbocharger bearing wear monitor that can provide information on the condition of a turbocharger.

A turbocharger monitor under the present invention is configured for use with a turbocharger having a rotor and a housing, the rotor being configured to rotate on one or more bearings about an axis of rotation with respect to the housing. The turbocharger monitor features a sensor adapted and positioned with respect to the housing so as to sense rotor movement information, including both rotor rotation information and rotor displacement information. The rotor rotation information pertains to rotation about the axis of rotation, such that a rotor rotational speed may be calculated from the rotor rotation information. The rotor displacement information pertains to displacement from the axis of rotation, such that rotor displacement from the axis of rotation may be calculated from the rotor displacement information, and used to estimate the condition of the bearing. The turbocharger monitor further features a controller configured to receive the rotor movement information from the blade sensor, and to establish indicators of rotor rotation speed and bearing condition from the rotor movement information.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather it is intended to provide particular examples of them.

Typical embodiments of the present invention reside in a bearing monitor system configured to monitor the health (i.e., the wear and degradation) of turbocharger bearings. Preferred embodiments of the invention are assemblies that assess the off-axis movement of a turbocharger rotor. As such, the monitors of this invention are designed to provide an indication of needed turbocharger service based on actual bearing wear.

Figure 1:
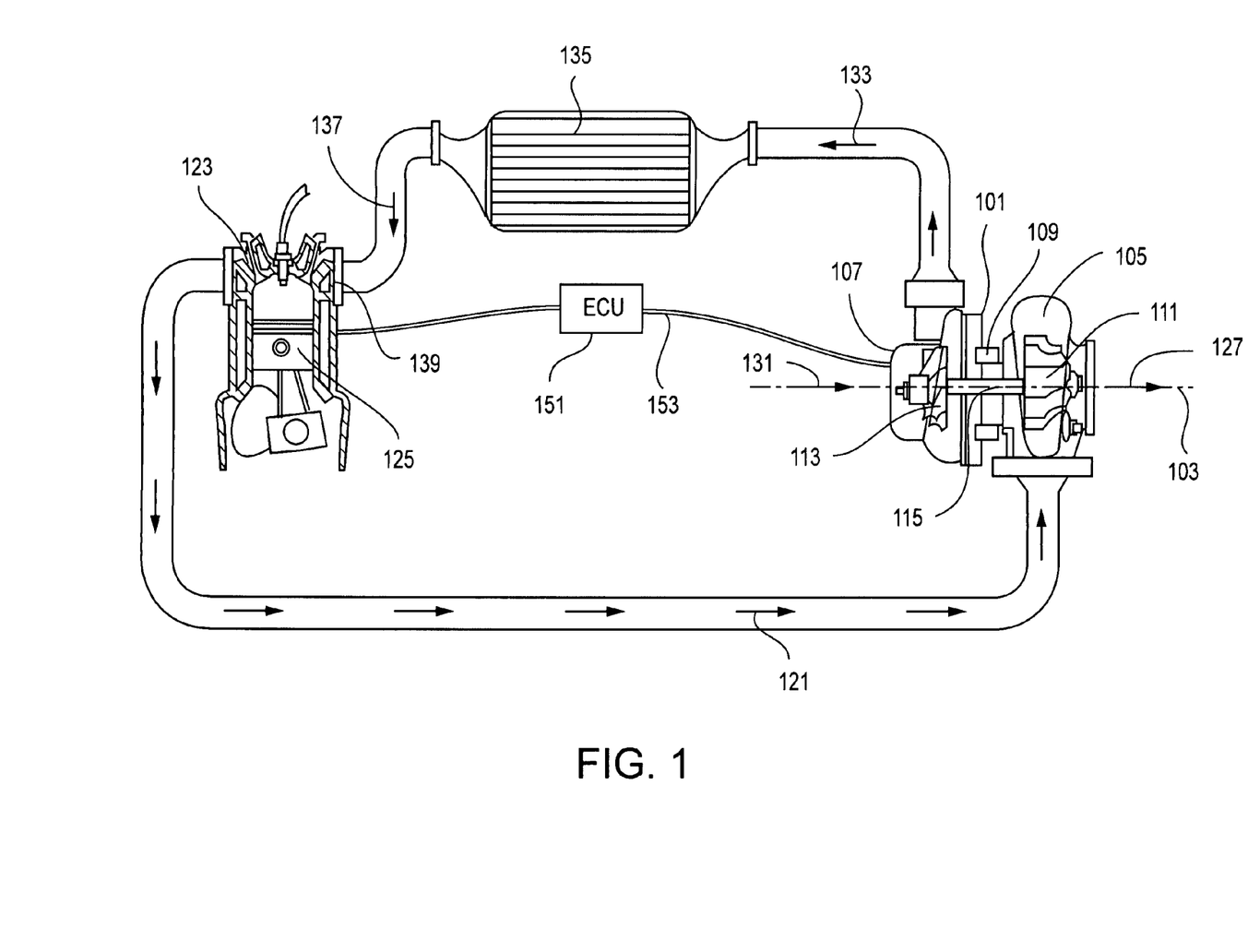
FIG. 1 is a first embodiment of an internal combustion engine system including a turbocharger.
Figure 2:
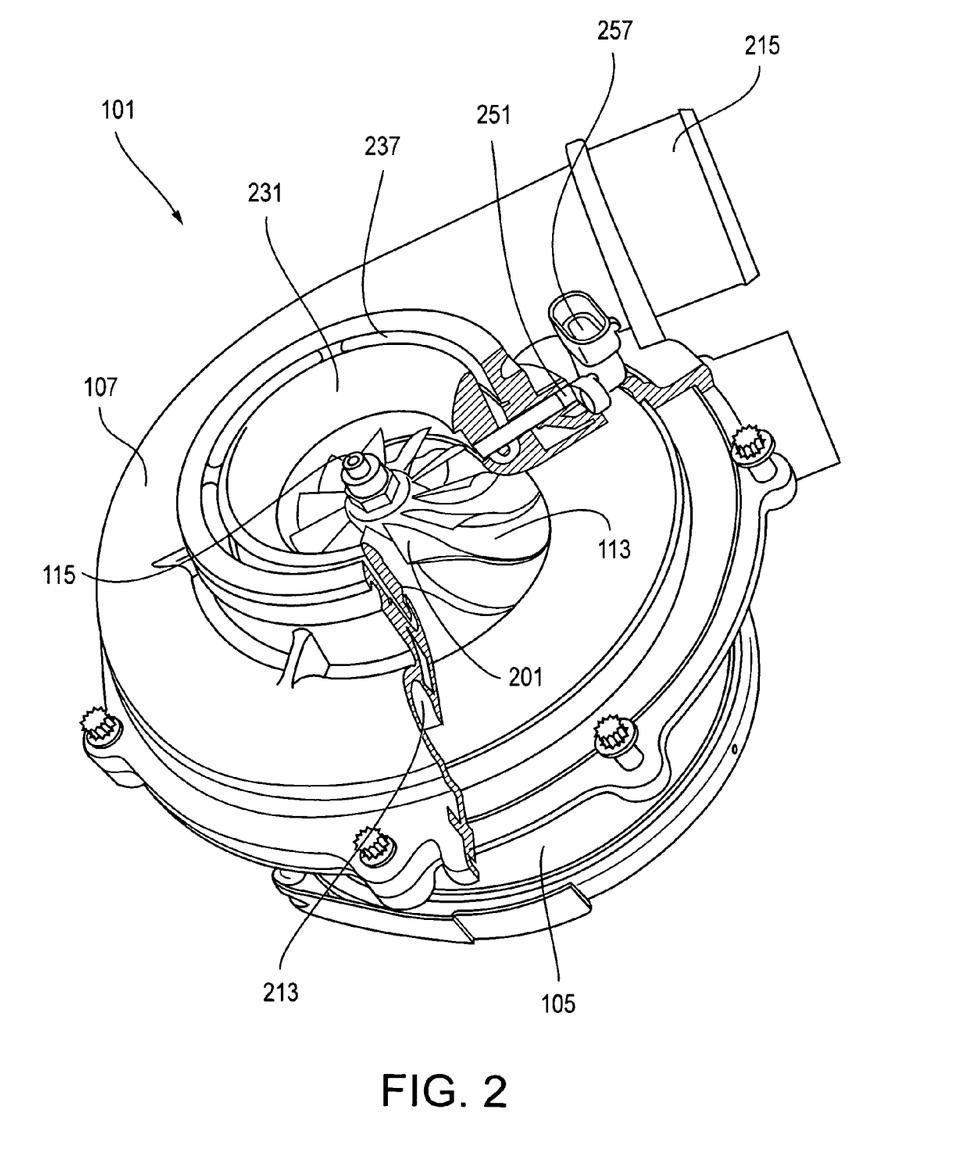
FIG. 2 is a cutaway perspective view of the turbocharger depicted in FIG. 1, including a sensor.

With reference to FIGS. 1 and 2, in a first embodiment of the invention, a turbocharger 101 includes a turbocharger housing, a rotor configured to rotate within the turbocharger housing along an axis of rotor rotation 103, axial bearings and journal bearings. The turbocharger housing includes a turbine housing 105, a compressor housing 107, and a bearing housing 109 that connects the turbine housing to the compressor housing.

The rotor includes a turbine wheel 111 located substantially within the turbine housing, a compressor wheel 113 located substantially within the compressor housing, and a shaft 115 extending along the axis of rotor rotation, through the bearing housing, to connect the turbine wheel to the compressor wheel. The journal bearings (not shown) are at two locations within the bearing housing, and are configured to restrict the shaft (and thus the rotor) from rotating or translating off the axis of rotor rotation. The axial bearing (not shown) is within the bearing housing, and is configured to restrict the shaft from translating along the axis of rotor rotation.

The turbine housing 105 and turbine wheel 111 form a turbine configured to circumferentially receive a high-pressure exhaust gas stream 121 from an exhaust manifold 123 of an internal combustion engine 125. The turbine wheel (and thus the rotor) is driven in rotation around the axis of rotor rotation 103 by the high-pressure exhaust gas stream, which becomes a lower-pressure exhaust gas stream 127 and is axially released into an exhaust system (not shown).

The compressor housing 107 and compressor wheel 113 form a compressor. The compressor wheel, being driven in rotation by the exhaust-gas driven turbine wheel 111, is configured to compress axially received ambient air 131 into a pressurized air stream 133 that is ejected circumferentially from the compressor. The pressurized air stream is characterized by an increased temperature, over that of the ambient air, due to the compression process, but may be channeled through a convectively cooled charge air cooler 135 configured to dissipate heat from the pressurized air stream, and thereby increase its density. The resulting cooled and pressurized air stream 137 is channeled into an intake manifold 139 on the internal combustion engine.

The internal combustion engine is provided with an engine control units (ECU) 151 configured to conduct typical ECU functions. These functions may include known turbocharger control functions, such as controlling the operation of a turbocharger wastegate.

Figure 3:
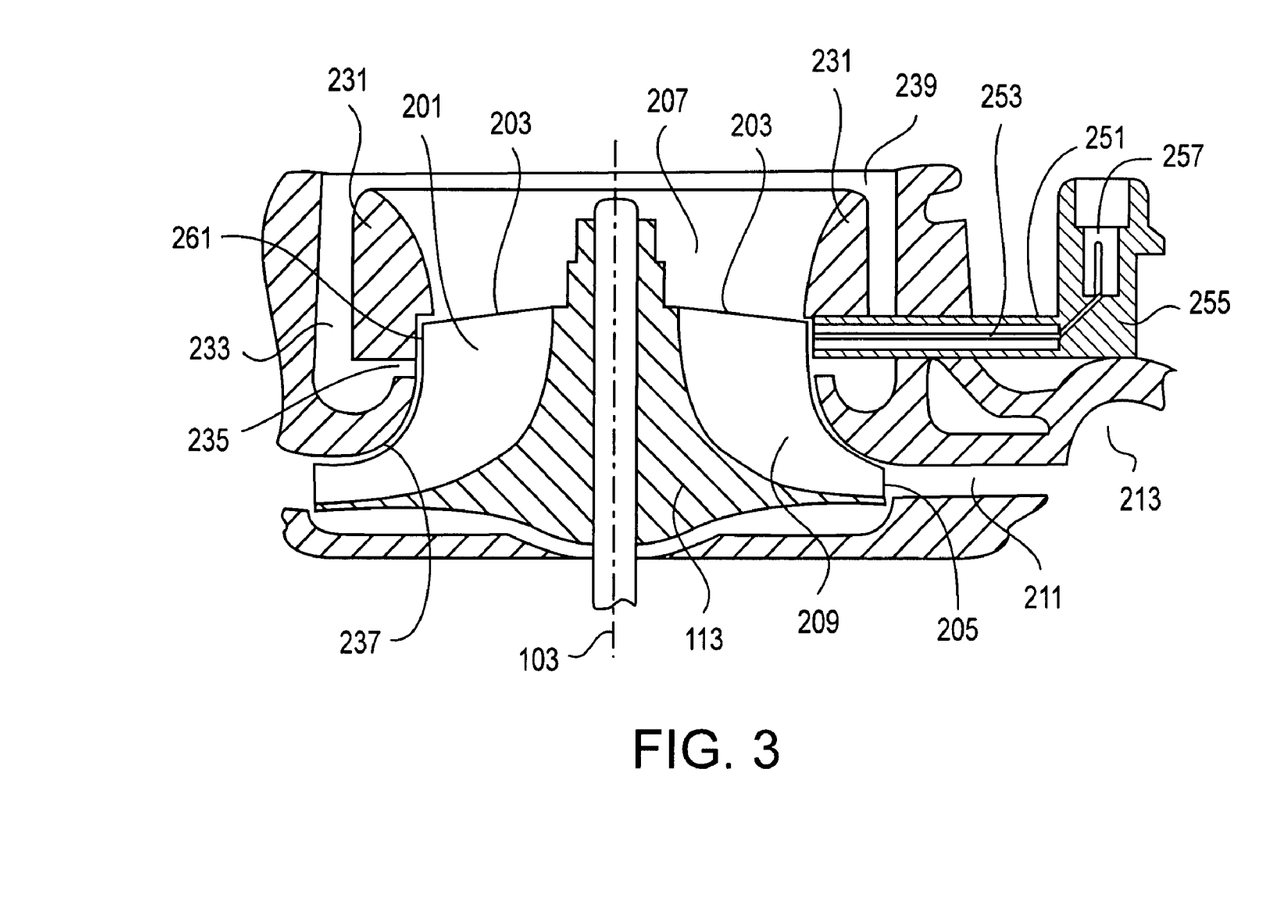
FIG. 3 is a partial cross-sectional view of a compressor of the turbocharger depicted in FIG. 2.

With reference to FIGS. 1-3, which depict the compressor, the compressor wheel 113 includes a plurality of blades 201 (i.e., impellers) that define an inducer 203 (i.e., a typically circular intake end of the combined set of blades) and an exducer 205 (i.e., a typically annular output end of the combined set of blades). The compressor housing and compressor wheel form an air passageway, including an inlet passage 207 leading axially into the inducer from an ambient air source, an impeller passage 209 leading from the inducer to the exducer and substantially conforming to this space within which the compressor wheel impellers rotate, a diffuser 211 leading radially outward from the exducer, and a volute 213 extending around (and include communication with) the diffuser. The volute is in a scroll shape, and forms an outlet passage 215 through which the pressurized air stream is ejected circumferentially (i.e., normal to the circumference of the scroll at the exit) as the pressurized air stream 133.

The compressor housing may further form a ported shroud 231 defining a shroud passageway 233 that includes one or more ports 235 opening through an impeller passage wall 237 into the impeller passage 209 between the inducer 203 and the exducer 205, and a substantially annular opening 239 into the inlet passage. The ported shroud thus creates a second passageway connecting the inlet passage to the impeller passage, wherein the second passageway does not extend through the inducer.

A turbocharger monitor of the first embodiment includes a sensor 251 adapted and positioned with respect to the compressor housing 107 so as to sense rotor movement information. The sensor includes a sensor element 253, and a sensor housing 255 forming an electrical connector 257. The sensor element is positioned to extend through the impeller passage wall 237 proximate the compressor wheel such that through a sensing surface 259, it detects the passage of an outer-edge portion 261 of each passing detectable blade (i.e., each blade for which the outer-edge portion can pass within the sensor's operable range). To detect passage, the sensor detects blade proximity.

The outer-edge portion 261 of each blade substantially conforms to the impeller passage wall as the rotor rotates, and in this embodiment, it extends in a direction substantially parallel to the axis of rotor rotation. The sensor element is oriented to detect blade distance in a direction substantially normal to the axis of rotor rotation in this embodiment. As a result, the blade sensor is primarily sensitive to rotor translation, rotation or bending that causes the compressor wheel to translate in a radial direction.

The sensed rotor movement information includes both rotor rotation information and rotor displacement information. More particularly, the rotor rotation information pertains to a measurement of rotor rotation (e.g., a measurement of rotational displacement or a measurement of rotational velocity) about its axis of rotation, and the rotor displacement information pertains to a measurement of rotor displacement off of its axis of rotation (e.g., a measurement of off-axis rotation or a measurement of off-axis translation).

The turbocharger monitor of the first embodiment further includes a controller configured to receive the sensed rotor movement information from the sensor. It is further configured to establish indicators of rotor rotational speed and bearing condition from the rotor movement information, and thus functions both as a turbocharger speed sensor and a bearing wear monitor.

The controller may be part of the ECU 151 (as depicted), or may be a separate control unit that is preferably connected to ECU, such as by a digital communications link. The controller receives the sensed rotor movement information via a cable (153) that connects the controller to the electrical connector 257 of the blade sensor 251. The controller receives an unconditioned signal from the sensor in an analog format.

In alternative embodiments, the sensor could include an internal or external signal processing system configured to send a conditioned signal to the controller. For example, the turbocharger could be configured with an electric actuator configured to control operation of the turbocharger, such as by operating a wastegate or variable geometry vanes within the turbocharger. The electric actuator could be configured to receive blade proximity information in analog format from the sensor, and to provide the blade proximity information to the engine control unit in a digital format.

Figure 4:
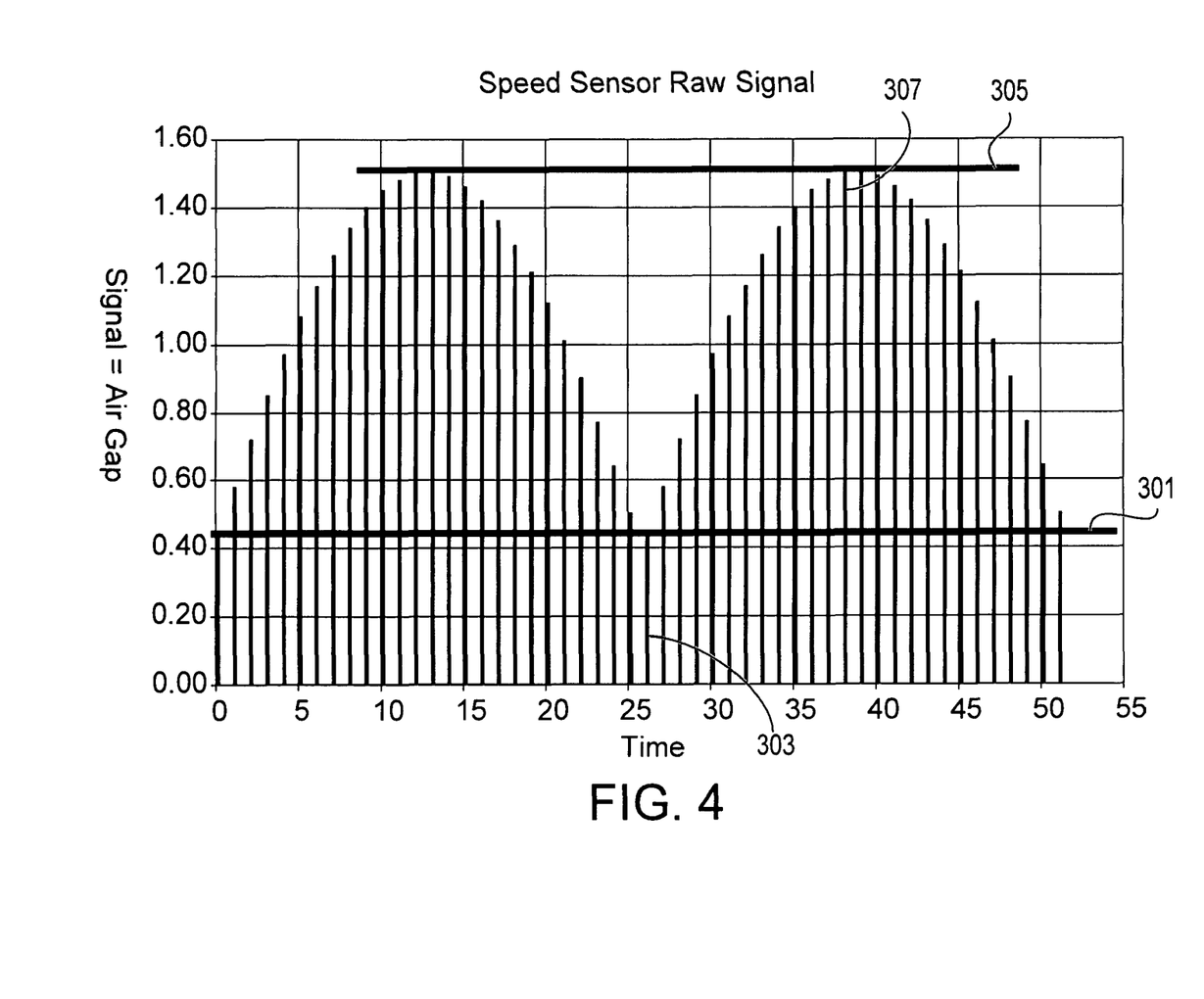
FIG. 4 is a graphical representation of an unconditioned analog signal from the sensor depicted in FIG. 2.
Figure 6:
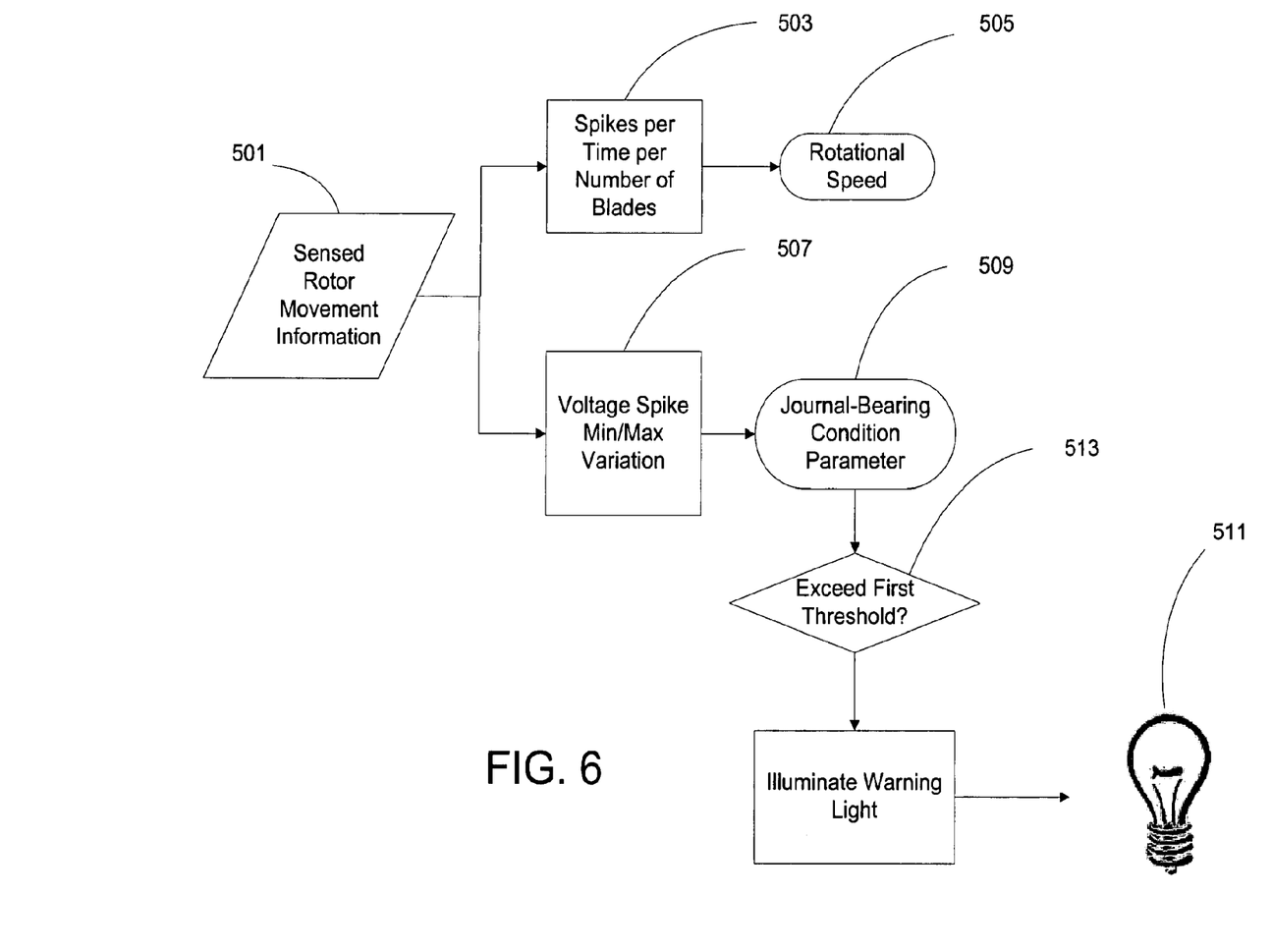
FIG. 6 is a diagram depicting the calculation of indicators of rotor rotation speed and bearing condition, and the illumination of a warning light.

With reference to FIGS. 4 and 6, the sensed rotor movement information may be in the form of a series of voltage spikes, as depicted in the graph of FIG. 4, showing hypothetical blade sensor signal results over a short period of time. Each depicted voltage spike (i.e., sensed rotor movement information 501), as shown on the vertical axis of the graph, represents the distance between the sensor and a passing impeller-passage-wall edge 261 of a blade 201. The number of voltage spikes over a given period of time, or the time period between voltage spikes, provides rotor rotation information. This information, when used with known information on the number of blades on the compressor wheel that can pass within the operable range of the blade sensor, can be used to calculate 503 the rotational speed 505 of the rotor around the axis of rotor rotation 103 (i.e., an indicator of rotor rotation speed).

Over a series of blade-sensor readings (as shown), the voltage level of each voltage spike may vary sinusoidally between a minimum voltage level 301 from a minimum-level voltage spike 303 to a maximum voltage level 305 from a maximum-level voltage spike 307. The difference between the minimum voltage level and the maximum voltage level provides information 507 on the variation of blade distance from the sensor, and thus rotor displacement information. This information, when used with comparable baseline variation information taken at a time when the journal bearings were known to be healthy (i.e., when the level of bearing wear is known to be minimal), can be used to calculate a journal-bearing condition parameter 509 (i.e., an indicator of bearing condition), such as one establishing a level of bearing wear.

The ECU 151 is configured such that, when this journal-bearing condition parameter exceeds a preestablished level (e.g., a bearing wear limit), the ECU will take one or more actions to notify operators of the internal combustion engine 125, and/or to directly protect the internal combustion engine and its operators from possible dangers that can occur when a turbocharger fails due to warn bearings.

For example, one such action is for the controller (e.g., the ECU) to send a signal to the engine operators by illuminating a warning light on a control panel. Another possible such action is for the controller to reduce the rate of compressor wheel rotation (i.e., the rate of rotor rotation), such as by causing a wastegate to be opened, and yet another possible such action is for the controller to reduce the operating rate of the internal combustion engine, such as by restricting fuel flow to one or more of its combustion chambers. Optionally, different actions may be taken at different blade-distance variation thresholds. For example, a warning light 511 may be illuminated at a first threshold 513, and compressor wheel rotation may be reduced at a second threshold.

The controller is preferably configured such that the rotor displacement information is developed and compared only under certain consistent, preestablished conditions. More particularly, the controller is initially provided with a set of exactly one, two or perhaps more, operating conditions under which rotor displacement information will be developed. During a time period in which bearing wear is known to be minimal, blade distance variation is sensed at each of the operating conditions. Then, at subsequent times when the turbocharger is experiencing one of the preestablished operating conditions, the sensor senses blade distance variation information, and the controller calculates the journal bearing condition parameter.

An operating condition may be determined by one or more measurable parameters. Such parameters may include the rotational speed of the turbocharger, and the temperature and/or pressure of the oil. In order to have frequent monitoring of the bearings, it may be desirable to select a commonly occurring condition as the operating conditions. Additionally, it may be preferable for the operating condition to be at a rotational frequency at which critical vibrational modes of the rotor (e.g., lower frequency modes characterized by large off-axis movement of the compressor and/or turbine wheels) could be excited.

The controller may be further configured to track information pertaining to the journal bearing condition parameter, and to report this information when so requested during a diagnostic procedure.

Figure 5:
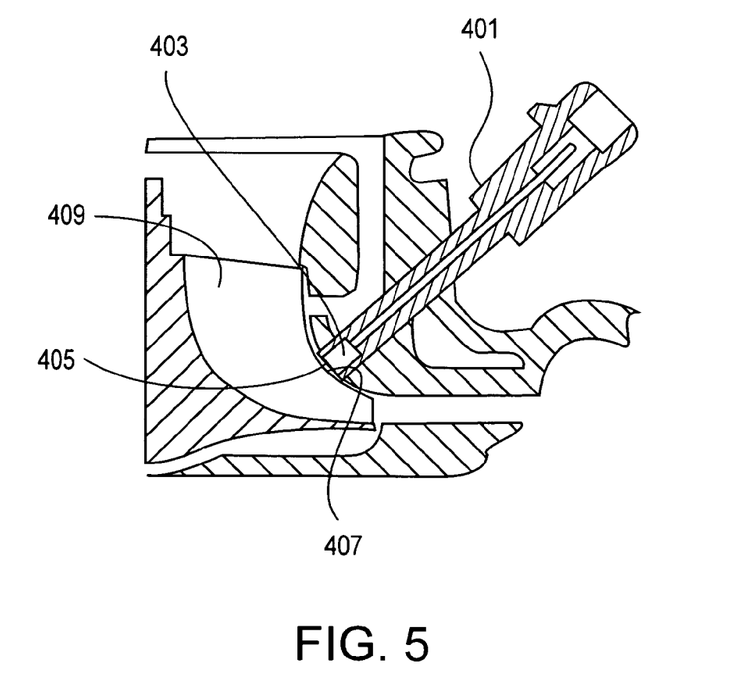
FIG. 5 is a partial cross-sectional view of a compressor from a second embodiment of an internal combustion engine system including a turbocharger.

With reference to FIG. 5, a second embodiment of the invention is configured similar to the first, except for the position, orientation and design of the blade sensor. This embodiment includes a blade sensor 401 having a sensor element 403 positioned such that, through a sensing surface 405, it detects the passage of an outer-edge portion 407 of each detectable blade 409. The sensor element is oriented to detect blade distance in a direction substantially normal to the direction in which the outer edge extends. The outer-edge portion extends in a direction substantially between being normal to, and being parallel to, the axis of rotor rotation (e.g., angled between 30 and 60 degrees from the axis), such that the blade sensor is sensitive to rotor translation, rotation or bending that causes the compressor wheel to translate in a radial and/or an axial direction.

Other embodiments may be configured with sensors positioned and oriented to sense rotor movement, with respect to the turbocharger housing, at other locations on the rotor. For example, a sensor could be positioned to sense the movement of any given portion of the turbine wheel or the shaft. Nevertheless, it is anticipated that more cost-efficient designs can be developed by locating the sensor at the compressor end of the rotor, so as to avoid the high-temperature conditions at the turbine end of the rotor. Also, it is anticipated that more accurate data will be developed if the sensor is positioned so as to avoid vibrational nodes of the rotor for potentially critical modes of vibration.

Various other embodiments may use different types of sensors. Included among possible sensor types are giant magnetoresistive (GMR) sensors, anisotropic magnetoresistive (AMR) sensors, variable reluctance (VR) sensors and eddy current sensors. Additionally, other embodiments may be provided with a sensor directed at portions of the rotor other than the compressor wheel (e.g., the turbine wheel or the shaft).

It is to be understood that the invention comprises apparatus and methods for designing and for producing related bearing monitor systems, as well as the apparatus and methods of the bearing monitor system itself. Additionally, various embodiments of the invention are envisioned to include turbochargers that incorporate portions of the present bearing monitor system, internal combustion engines that incorporate turbochargers and the present bearing monitor system, and vehicles that incorporate such internal combustion engines. Alternate variations of these embodiments could comprise other types of turbine-related devices that incorporate a bearing monitor system. In short, the above disclosed features can be combined in a wide variety of configurations within the anticipated scope of the invention.

While particular forms of the invention have been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A method for monitoring the wear of a bearing of a turbocharger, wherein the turbocharger has a housing containing a wheel rotating with respect to the housing, the wheel including a plurality of blades, comprising:
   operating a blade sensor to detect blade proximity information for the plurality of blades on the rotating wheel as they pass by the blade sensor, the blade proximity information being indicative of a blade distance between passing blades and the blade sensor;
   calculating a bearing condition using a control system configured to monitor the wear of a bearing by establishing the bearing condition based on a variation range over a series of passing blades between the blade proximity information of the minimum blade distance and the blade proximity information of the maximum blade distance, and comparing that variation range to a previously established variation range representing a healthy bearing condition; and
   when the calculated bearing condition exceeds a preestablished level, activating one or more preestablished control system actions that protect against turbocharger failure due to worn bearings.

2. The method of claim 1, wherein the one or more control system actions include signaling a person that there is a bearing problem.

3. The method of claim 1, wherein the one or more control system actions include reducing the rate of compressor wheel rotation.

4. The method of claim 1, wherein the bearing condition is only evaluated when established under preestablished operating conditions.

5. The method of claim 1, and further comprising:
tracking information pertaining to the bearing condition; and
reporting the tracked information during a diagnostic procedure.

6. A bearing wear monitor for monitoring the wear of a bearing of a turbocharger, wherein the turbocharger has a housing containing a wheel rotating with respect to the housing, the wheel including a plurality of blades, comprising:
a sensor configured to detect blade proximity information for the plurality of blades on the rotating wheel as they pass by the blade sensor, the blade proximity information being indicative of a blade distance between passing blades and the blade sensor; and
a means for monitoring the wear of a bearing by establishing a bearing condition based on a variation range over a series of passing blades between the blade proximity information of the minimum blade distance and the blade proximity information of the maximum blade distance, and comparing that variation range to a previously established variation range representing a healthy bearing condition.

7. A bearing wear monitor for monitoring the wear of a bearing of a turbocharger, wherein the turbocharger has a housing containing a wheel rotating with respect to the housing, the wheel including a plurality of blades, comprising:
a sensor configured to detect blade proximity information for the plurality of blades on the rotating wheel as they pass by the blade sensor, the blade proximity information being indicative of a blade distance between passing blades and the blade sensor; and
a controller configured to monitor the wear of a bearing by calculating a bearing condition based on a variation range over a series of passing blades between the blade proximity information of the minimum blade distance and the blade proximity information of the maximum blade distance, and comparing that variation range to a previously established variation range representing a healthy bearing condition.

8. The bearing wear monitor of claim 7, wherein the controller is operative to measure and store the previously established variation range at a time when the level of bearing wear was minimal.

9. The bearing wear monitor of claim 7, wherein the controller is configured to only evaluate the bearing condition when the bearing condition is developed at substantially the rotor rotational speed at which the previously established variation range was developed.

10. The bearing wear monitor of claim 7, wherein the controller is configured to only evaluate the bearing condition when the bearing condition is developed at substantially the rotor rotational speed, temperature and oil pressure at which the previously established variation range was developed.

11. The bearing wear monitor of claim 10, wherein the controller is operative to store the previously established variation range for only one operating condition.

12. The bearing wear monitor of claim 7, wherein the controller is operative to send a signal when the bearing condition indicates that bearing wear has exceeded a bearing wear threshold.

13. The bearing wear monitor of claim 7, wherein the controller is operative to light a warning light when the bearing condition indicates that bearing wear has exceeded a first bearing wear threshold, and to reduce the rate of rotor rotation when the bearing condition indicates that bearing wear has exceeded a second bearing wear threshold.

14. A turbocharger, comprising:
a turbine housing containing an exhaust-driven turbine;
a compressor housing containing a compressor wheel configured to be driven in rotation with respect to the compressor housing by the turbine, the compressor wheel including a plurality of compressor blades; and
a bearing wear monitor for monitoring the wear of a bearing of the turbocharger, the bearing wear monitor including
a sensor configured to detect blade proximity information for the plurality of blades on the rotating compressor wheel as they pass by the blade sensor, the blade proximity information being indicative of a blade distance between passing blades and the blade sensor, and
a controller configured to monitor the wear of the bearing by calculating a bearing condition based on a variation range over a series of passing blades between the blade proximity information of the minimum blade distance and the blade proximity information of the maximum blade distance, and comparing that variation range to a previously established variation range representing a healthy bearing condition.

15. An internal combustion engine, comprising:
a turbocharger including a compressor and a turbine;
a block defining a combustion chamber for combusting fuel;
an intake manifold adapted to received pressurized air from the turbocharger compressor to be mixed with fuel and combusted in the combustion chamber; and
an exhaust manifold adapted to drive the turbocharger turbine with combusted gasses exhausted by the combustion chamber;
wherein the turbocharger includes
(a) a turbine housing containing an exhaust-driven turbine,
(b) a compressor housing containing a compressor wheel configured to be driven in rotation with respect to the compressor housing by the turbine, the compressor wheel including a plurality of compressor blades, and
(c) a bearing wear monitor for monitoring the wear of a bearing of the turbocharger, the bearing wear monitor including
a sensor configured to detect blade proximity information for the plurality of blades on the rotating compressor wheel as they pass by the blade sensor, the blade proximity information being indicative of a blade distance between passing blades and the blade sensor; and
a controller configured to monitor the wear of the bearing by calculating a bearing condition based on a variation range over a series of passing blades between the blade proximity information of the minimum blade distance and the blade proximity information of the maximum blade distance, and comparing that variation range to a previously established variation range representing a healthy bearing condition.

16. The internal combustion engine of claim 15, and further comprising an engine control unit adapted to serve as the controller, wherein the controller receives an unconditioned signal from the sensor.

17. The internal combustion engine of claim 16, wherein the controller is adapted to light a warning light when the bearing condition indicates that bearing wear has exceeded a first bearing wear threshold, and when the bearing condition indicates that bearing wear has exceeded a second bearing wear threshold, to do at least one of: restrict fuel flow to the combustion chamber, and reduce the speed of compressor wheel rotation.

18. The internal combustion engine of claim 15, and further comprising:
an engine control unit adapted to serve as the controller; and
an electric actuator operative to control operation of the turbocharger and digitally communicate with the engine control unit;
wherein the electric actuator is operative to receive the blade proximity information in an analog format from the sensor; and
wherein the electric actuator is operative to provide the blade proximity information to the engine control unit in a digital format.

* * * * *